(12) United States Patent
Güntner et al.

(10) Patent No.: US 11,649,523 B2
(45) Date of Patent: May 16, 2023

(54) PROCESS AND APPARATUS FOR ROASTING OF METAL SULFIDE CONCENTRATES AND/OR RESIDUES

(71) Applicant: OUTOTEC (FINLAND) OY, Espoo (FI)

(72) Inventors: Jochen Güntner, Kahl (DE); Alexandros Charitos, Frankfurt am Main (DE); Jörg Hammerschmidt, Erlensee (DE)

(73) Assignee: METSO OUTOTEC FINLAND OY, Tampere (FI)

( * ) Notice: Subject to any disclaimer, the term of this patent is extended or adjusted under 35 U.S.C. 154(b) by 701 days.

(21) Appl. No.: 16/490,988

(22) PCT Filed: Jun. 2, 2017

(86) PCT No.: PCT/EP2017/063519
§ 371 (c)(1),
(2) Date: Sep. 4, 2019

(87) PCT Pub. No.: WO2018/162089
PCT Pub. Date: Sep. 13, 2018

(65) Prior Publication Data
US 2020/0010924 A1 Jan. 9, 2020

(30) Foreign Application Priority Data

Mar. 7, 2017 (WO) ................. PCT/EP2017/055336

(51) Int. Cl.
*C22B 11/00* (2006.01)
*C22B 1/10* (2006.01)
(Continued)

(52) U.S. Cl.
CPC ................ *C22B 11/04* (2013.01); *C22B 1/10* (2013.01); *C22B 1/2406* (2013.01); *C22B 11/02* (2013.01); *C22B 15/0013* (2013.01)

(58) Field of Classification Search
CPC ......... C22B 1/10; C22B 1/2406; C22B 11/02; C22B 11/04
See application file for complete search history.

(56) References Cited

U.S. PATENT DOCUMENTS 3,094,409 A * 6/1963 Secondo ................... C22B 1/10
75/754
4,368,176 A 1/1983 Abishev et al.

FOREIGN PATENT DOCUMENTS

CN 105112677 A 12/2015
CN 106048209 A 10/2016
(Continued)

OTHER PUBLICATIONS

Office Action (The First Office Action) dated Aug. 20, 2020, by the State Intellectual Property Office of People's Republic of China in corresponding Chinese Patent Application No. 201780088496.4 and an English Translation of the Office Action. (13 pages).

(Continued)

*Primary Examiner* — Anthony J Zimmer
*Assistant Examiner* — Dean Mazzola
(74) *Attorney, Agent, or Firm* — Buchanan Ingersoll & Rooney PC (57) ABSTRACT

A process for roasting of metal concentrate wherein concentrate particles are fed into a roaster where they are thermally treated at a temperature in the range of 500 and 1200° C. in a fluidized bed to form a calcine. At least parts of the calcine are withdrawn from the roaster together with a gas stream as a solid fraction. Concentrate particles with a diameter at least 50% smaller than the average diameter of the concentrate particles are separated as small particles (Continued)

and/or particles from the gas-solid-fraction are separated in at least one step as small calcine particles and/or particles are gained in another hydrometallurgical step as other particles. Defined particles are pelletized, whereby at least 80% of the pellets feature a diameter of at least 80% of the concentrate particles average diameter. The pellets are fed into the roaster.

11 Claims, 5 Drawing Sheets

(51) Int. Cl.
  *C22B 1/24* (2006.01)
  *C22B 11/02* (2006.01)
  *C22B 15/00* (2006.01)

(56) References Cited

FOREIGN PATENT DOCUMENTS

| CN | 106086437 A | 11/2016 |
|---|---|---|
| EP | 2 543 746 A1 | 1/2013 |
| KR | 10-2013-0108341 A | 10/2013 |
| WO | 2012113980 A1 | 8/2012 |

OTHER PUBLICATIONS

Office Action (Notification of Reason for Refusal) dated Nov. 10, 2020, by the Korean Intellectual Property Office in corresponding Korean Patent Application No. 10-2019-7026828, and an English Translation of the Office Action. (13 pages).

International Search Report (PCT/ISA/210) dated Nov. 2, 2017, by the European Patent Office as the International Searching Authority for International Application No. PCT/EP2017/063519.

Written Opinion (PCT/ISA/237) dated Nov. 2, 2017, by the European Patent Office as the International Searching Authority for International Application No. PCT/EP2017/063519.

International Preliminary Report on Patentability (PCT/IPEA/409) dated May 22, 2019, by the European Patent Office as the International Searching Authority for International Application No. PCT/EP2017/063519.

Office Action (First Examination Report) dated Apr. 7, 2021, by the Patent Office, Government of India, in corresponding India Patent Application No. 201917036693 with an English Translation of the Office Action (7 pages).

* cited by examiner

PROCESS AND APPARATUS FOR ROASTING OF METAL SULFIDE CONCENTRATES AND/OR RESIDUES

The invention relates to a process and a corresponding apparatus for roasting of metal sulfide concentrate, wherein concentrate particles are fed into a roaster where they are thermally treated at temperatures between 500 and 1200° C. in a fluidized bed to form a calcine, and wherein at least parts of the calcine are withdrawn from the roaster together with a gas stream as a solid fraction.

Typical roasting processes deal with the roasting of gold, pyrite, zinc, copper, cobalt, nickel and PGMs. Roasting processes can be realized using dry feed and slurry feed. In case of slurry feed, the slurry is fed from a slurry tank to a slurry distribution box. Within the slurry distribution box, water is added to control roaster temperature. Alternatively, the fed slurry entering the roaster is de-watered. Typical reactor types for a roaster are fluidized bed reactor, rotary kiln or multiple hearth furnace.

In case of a fluidized bed reactor, gases and at least small particles of the roasted concentrate (calcine) are withdrawn over the top of the roaster and fed into at least one separating device for separating solid particles. The at least one gas-solid separating device can be designed as evaporative cooler and/or waste heat boiler (combined called cooler), cyclone(s) connected in parallel or in series. Further, an electrostatic precipitator (ESP) is foreseen downstream of the separating device, which is why a cooling of the gas-solid-mixture is particularly important. Using a waste heat boiler has the additional advantage of producing saturated/superheated steam for internal use or for electricity production.

The combined calcine streams directly withdrawn from the fluidized bed, from the cooler, from the cyclones and/or from the electrostatic precipitator enter eventually the leaching step. Alternatively, e.g. in the case of copper, the calcine particles may be directed to a smelter or electric furnace unit operation.

The general tendency of sulfide concentrates becoming finer in size impacts the operation of roasters today significantly. It is justified based on the declining ore grades worldwide which allows concentrate production at desired metal yield at low particle size. Typical issues encountered during roasting are the following. During operation of bubbling fluidized bed roasters (typical for zinc, pyrite, copper, Nickel, cobalt and PGM metals), oxidation of small concentrate particles at the top of the roaster occurs, thus leading to the issue of a significant temperature difference between the bottom of the roaster (roaster bed) and its top (free-board). As a result the capacity of the roaster furnace is limited since temperature at the freeboard may exceed 1000° C. and reach a range above refractory specifications. Moreover, the amount of small calcine particles withdrawn from the top of the roaster increases, which as explained below is worse in terms of sulfide and sulfate sulfur composition in comparison to calcine particles removed from the bottom of the reactor (via an underflow or overflow exit). In the case of Circulating Fluidized Beds small concentrate (calcine) particles cannot be separated selectively by the recycle cyclone and this leads to a not-optimal chemical composition, expressed as increased organic carbon content in the calcine, and further issues on the downstream leaching step.

The temperature difference explained above also leads to worsening of the particles not withdrawn over the top of the roaster, i.e. those removed from the roaster overflow and underflow exits. This can be understood, since the temperature difference between roaster top and bottom may lead to a lower than specified temperature at the bottom roaster region thus leading to an increased sulfide sulfur content.

The problematic mentioned above is directly reflected to the leaching step. In the case of zinc sulfide roasting, sulfur present as sulfate (particularly associated to small calcine particles, i.e. those withdrawn as a gas-solid fraction from the roaster top and reporting to the cooler, cyclone(s), and electrostatic precipitator) leads to a higher bleed stream from the electrolytic circuit which has to be neutralized and this is associated with costs. Moreover, zinc ferrite formation which is associated to temperature and hence to insufficient temperature control leads to higher energy requirements in the leaching circuit. Even worse, unconverted zinc sulfide results to reduction of zinc recovery.

In this leaching step, in the case of double refractory gold bearing concentrates, contained organic carbon will lead to problems with regard to gold recovery through a phenomenon termed as "pregg robing". It is well-known that dissolved gold-cyanide complexes are absorbed by organic carbon, thus leading to loss of gold. The above mechanism is similar as is the case for activated carbon, however activated carbon can be retained through respective screens.

Typically between 10 and 100 wt.-% of the overall roaster load is withdrawn over the top of the fluidized bed roaster. However, composition of the particles withdrawn from the bed differs significantly from the particles removed from the top of the roaster. Main aspects hereto are the sulfide- and sulfate sulfur content. Particles withdrawn from the bed (near the bottom through an overflow or an underflow exit show a sulfide sulfur content of below 0.1 wt.-% and/or a sulfate sulfur content of below 0.5 wt.-%, while the particles from the top of the roaster feature a sulfide sulfur content of 0.3-8 wt.-% and/or a sulfate sulfur content of up to 40 wt.-%. This is due to the fact that particles from the fluidized bed have a higher residence time which is why sulfide sulfur and/or carbon may be oxidized in the roaster and that roasting temperatures within the roaster disallow sulfation of a number of components, e.g. iron, which is why their amount of sulfate sulfur is minimized.

It is state of the art to recycle particles from the gas-solid separation device to enhance the residence time, and, therefore, ensure a higher rate of roasting as well as a lower carbon and/or sulfide- and/or sulfate sulfur content.

However, a fraction of particles with very low diameters, especially below 15 µm, are so small that they are not separated selectively in the separation device and passed back into the reactor, but are withdrawn together with a gas stream into the latter process steps. In addition, recycling in the above mentioned manner would also not even touch upon the issues of temperature difference between roaster top and bottom nor the issue of ferrite formation.

Summing up particularly fine particles will be lifted to the top and being withdrawn from there very fast, to steps where undesired sulfation is promoted, which implies that the roasting conversion as well as the lower sulfide and/or sulfate sulfur content and/or carbon is linked to particle size. The link to the sulfate sulfur content and particle size can be understood in that sulfation occurs to a large extent while cooling down the gas/solid flow within the cooler (evaporative cooler or waste heat boiler). For particles with a very low diameter compared to the average diameter, also recycling would show very low effects regarding conversion. Moreover, the small particles lifted to the roaster top would cause local heat release, as a result of their oxidation at this point, thus leading to a too high temperature difference between the roaster top and bottom which leads to lowering roaster capacity, potential limitations to refractory life time, as well as ferrite formation.

Therefore, the underlying reasoning behind the current invention is to find a possibility for roasting without encountering problems in roasting and later process steps, like leaching, caused by temperature differences within the roaster, incomplete roasting, ferrite formation and downstream sulfation leading to a high sulfide and/or sulfate and/or carbon containing calcine.

In detail, the invention proposes a separation of the concentrate particles before feeding them into the roaster, where they are similarly treated at temperatures between 500 and 1200° C. in a fluidized bed to from calcine. Concentrate particles with a diameter at least 50% smaller than the average diameter of the concentrate particles are separated as small particles. Small particles may be used directly after separation, or may temporarily be stored in a pond or dam as tailings. Such "tailings" can be used through some additional processing as also proposed herein.

Additionally or alternatively, particles withdrawn from the roaster together with a gas stream as a gas-solid fraction are separated in at least one step as small calcine particles. Then, the separated small particles out of the concentrate and/or the small calcine particles out of the gas-solid fraction are pelletized by mixing them, optionally with the use of a liquid moisturizer/binder. At least 80 wt-% of the pellets feature a diameter of at least 80% of the concentrate particles average diameter.

Preferably, 80 wt.-% of the pellets would have a particle size of below 3 mm for a good fluidization in the roaster. Even more preferably, 40-80% of the pellets should be below 0.5 mm to improve circulation if a circulating fluidized bed roaster is used. Thereby, a very homogeneous residence time is achieved. As a result larger/adequate residence times for the pellets and therefore minimization of sulfide- and/or sulfate sulfur and/or carbon is attained. In addition, sulfate sulfur is minimized also in that less sulfation occurs as result of less particles being entrained to the cooler, the lower temperatures of which in combination with the sulfur dioxide/trioxide gas concentration allow for additional sulfation of several components, e.g. iron, that are not favored within the roaster. In addition the reduction of the flow of small concentrate particles being entrained to the top of the roaster, because of pelletization, leads to a significant reduction of the temperature difference between the roaster top and bottom and thus allows for maintaining design capacity, prolonging refractory life time and minimizing ferrite formation, while allowing near complete oxidizing/burning of the contained sulfur and/or carbon.

Summing up, concentrate particles are fed into a roaster, where they are thermally treated at temperatures between 500 and 1200° C., preferably 600 to 950° C. in a fluidized bed to form a calcine. At least parts of the calcine are withdrawn from the roaster together with a gas stream as a solid fraction. Concentrate particles with a diameter at least 50%, preferably 75% smaller than the average diameter of the concentrate particles are separated as small particles, that can be utilized directly or stored as tailings, and/or particles from the gas-solid-fraction are separated in at least one step as small calcine particles. Additionally or alternatively it is possible to use particles from another hydrometallurgical process as other particles that can be utilized directly or stored as tailings and that may be used in combination with further particles. The small particles and/or the small calcine particles and/or the other particles, potentially in combination with further particles, are pelletized, optional mixed with a liquid binder to form pellets, whereby at least 80 wt.-% of the pellets feature a diameter of at least 80% of the concentrate particles average diameter, while 80 wt.-% of the particles have preferably a particle size lower than 3 mm for good fluidization and even more preferably 40-80% have a particle size lower than 0.5 mm for good recirculation in the circulating fluidized bed, and the pellets are fed into the roaster.

It should be pronounced that the other particles resulting from a hydrometallurgical process may be co-pelletized with further particles, which may be different than the small particles or the small calcine particles. For example a zinc producer may use the full concentrate stream as further particles.

Preferably, the small calcine particles are separated in a waste heat boiler, and/or an evaporative cooler, and/or a cyclone, an electrostatic precipitator to separate the small calcine particles in a steady and reliable manner.

Preferably, the metal concentrate contains at least 45 wt.-% zinc, at least 60 wt.-% pyrite, at least 2 g/t gold, at least 15 wt.-% copper, at least 40 wt.-% nickel, at least 1 wt.-% cobalt or at least 100 g/t PGMs (Platinum-Group Metals containing ruthenium, rhodium, palladium, osmium, iridium, and platinum) to ensure a high metal yield.

It is even more preferable, that the metal concentrate contains at least 45 wt.-% zinc, whereby the concentrate particles' average diameter is between 5 and 40 pm, that the metal concentrate contains at least 60 wt.-% pyrite, whereby the concentrate particles' average diameter is between 5 and 90 pm, that the metal concentrate contains at least 2 g/t gold, whereby the concentrate particles' average diameter is between 5 and 100 μm, that the metal concentrate contains at least 15 wt.-% copper, whereby the concentrate particles' average diameter is between 10 and 50 μm or that the metal concentrate contains at least 40 wt.-% nickel, whereby the concentrate particles' average diameter is between 5 and 40 μm, that the metal concentrate contains at least 1 wt.-% cobalt whereby the concentrate particles' average diameter is between 5 and 40 μm or that the metal concentrate contains at least 100 g/t PGMS, whereby the concentrate particles' average diameter is between 20-100 μm. The given values are typical for the respective metal.

In an embodiment of the invention, preferably directed to a gold-containing concentrate, the concentrate particles are fed into the roasting from of a slurry, which simplifies the handling of the particles. Preferably, the water containing of the slurry is between 20 and 70 wt.-%.

It is preferred that the small particles and/or at least part of the small calcine particles and/or other particles are pelletized such that at least 70 wt.-% are bigger as 500 μm. Particles with this size can be handled more easily. In the fluidized bed, particles with a diameter of 500 pm decompose to particles with the average diameter.

On the opposite, it is also preferred to pelletize the small particles and/or at least part of the small calcine particles and/or other particles to a pellet size of maximum 90 μm, preferably a pellet size between the lower limit of the particles' average diameter (ergo zinc: 5 to 90 μm, pyrite 5 to 90 μm, copper 10 to 90 μm, nickel: 5 to 90 μm, cobalt: zinc: 5 to 90 μm and PGMs: 20 to 90 μm) to form a fluidized bed with very homogeneous particle sizes.

Even more preferably, the amount of organic carbon and/or the amount of sulfide sulfur contained in compounds (including also elementary sulfur), with regard to the concentrate particles, is between 0.5 and 60, preferably 30 to 50 wt-%. For carbon content in this range, the invention is especially important in the case of roasting of gold bearing concentrates due to the phenomenon of pregg-robing occurring during the leaching step as explained above. Moreover, for sulfide sulfur within the above mentioned range the invention is of particular importance with regard to downstream applications in terms of reducing contained heating value (in the case of smelting) or to allow for high metal recoveries and economical operation (in the case of leaching) without encountering above identified problems with regard to sulfide and sulfate sulfur.

Further, the amount of organic carbon and/or the amount of sulfur contained in compounds (including also elementary sulfur) in the small particles is preferably more than 20 wt.-%, preferably 30 wt.-% higher than the average sulfur content contained in compounds (including also elementary sulfur) in all concentrate particles. For these particles, only a process according to the current invention enables a later process stage without the discussed problems connected to a high carbon and/or sulfur content.

Out of this reason, the invention is also particularly important for an amount of organic carbon and/or an amount of sulfide sulfur and/or sulfate sulfur, contained in compounds (including also elementary sulfur), in small calcine particles which is more than 15 wt-% higher than the average sulfide sulfur and/or sulfate sulfur and/or carbon content and/or arsenic of all calcine particles.

In another preferred embodiment of the invention, the small calcine particles contain at least 2 wt-%, preferably 5 wt.-% sulfate sulfur, which are particularly critical in the later leaching step.

Moreover, the other particles gained in another hydrometallurgical step features a sulfur content of at least 0.5 wt.-%, preferably at least 5 wt.-%. Moreover, a sulfur content of maximum 60 wt.-% is preferred. Thereby, a dumping of the sulfur-containing residues, often also loaded with heavy metals like e.g. lead, or high value metals such as silver or gold is avoided. Moreover, the sulfur content is an additional energy source in the roaster and the contained metals can be recovered from said particles.

Typical hydrometallurgical processes are divided into three general areas, namely leaching, solution concentration and purification and metal or metal compound recovery. In details, leaching comprises in-situ leaching, heap leaching, vat leaching, tank leaching and autoclave leaching. Solution concentration is mainly directed to solvent extraction while purification is mainly directed to impurity precipitation and metal recovery is directed to electrolysis and precipitation. Hence, the other particles mentioned above may be produced from several applications, including direct leaching (DL), Pure Jarosite (PJ) process, the Albion process, pressure oxidation (PDX) or biological oxidation (BIOX), before or after cyanide leaching in the case of gold. Above processes aim at reacting the concentrate in such a manner that pyro-metallurgical processing through roasting and acid plant application is not required. Nonetheless they produce a hydrometallurgical residue as discussed above which has to be treated.

Depending on the sulfur content of the produced particles from the above hydrometallurgical processes it may be chosen to process them as proposed herein alone or in combination with small particles, small calcine particles or further particles. An example to further particles may be concentrate feed particles or calcine particles or inert particles such as sand. Especially, for a sulfur content of other particles, resulting from hydro-metallurgical processing of above 10%, it is preferred to combine their treatment with small particles (i.e. small concentrate particles) and/or small calcine particles and/or further particles. This results to a more homogeneous distribution of the sulfur contained and thereby phenomena such as sulfur sublimation/ evaporation and not-controlled burning in the fluidized bed roaster are avoided.

Another preferred embodiment of the invention sets the average residence time for a circulating fluidized bed roaster to a value between 1 second and 10 hours, even more preferably between 10 min and 1 hour. Such average residence time enables a complete roasting conversion in a process according to the invention. Average residence times above 1 h are typically achieved when using a bubbling bed as a roaster at cost of high reactor footprint, while those below 1 min are achieved when using a flash type reactor operating in the pneumatic transport regime.

Preferably, secondary air is injected into the roaster which is heated to a temperature of at least 200° C. Thereby, a better mixing of the fluidizing gas and the secondary air, and, therefore, also a more homogenous reaction is achieved.

Even more preferred is the case where at least parts of the calcine are cooled in a fluid bed cooler, whereby it is most efficient that the air used as cooling medium is used as at least partly as secondary air and/or fluidized air in the roaster.

Additionally or alternatively, the separated small concentrate particles may exist in the form of tailings. As discussed, tailings are defined herein as small particles (i.e. small concentrate particles) that are stored in a storing device like a pond/dam or another storage area, having resulted from previous separation from all concentrate particles without further treatment. Furthermore, the definition of tailings is extended herein to include other particles, resulting from previous operation of a hydrometallurgical process, that are stored in a storing device like a pond or dam, without further treatment. Tailings will be typically available as pumpable slurry/paste or as a non-pumpable paste, depending on the degree of drying within the storage device. Should the tailings be stored in form of a pumpable slurry/paste then they are pumped to further processing as proposed herein, prior to the pelletization step.

In the case, that the tailings (resulting from sulfide concentrate or a hydrometallurgical process) are dried at least partially, e.g. as a result of natural evaporation, and are not available as pumpable slurry/paste, but as semi-dried non-pumpable paste (for example as a filter cake).

Thereby, the following options exist:

Firstly, the semi-dried tailings may be re-pulped to a pumpable slurry/paste using e.g. a rotary drum re-pulper, a high shear mixer or other re-pulping equipment. Subsequently, they are pumped to further processing as proposed herein, prior to the pelletization step.

Alternatively, the semi-dried tailings can be further dewatered/dried with use of any type of drying technology, which could be distributing the tailings onto a drying pad and utilize sunlight as a source of heat or using a closed space where pre-heated and potentially pre-dried air is blown into. Such an approach also facilitates material transport directly to the subsequent pelletization step, which may then take place via a conventional conveyor system.

Furthermore, it is preferred that the separated small particles (including those available as tailings in a pumpable slurry/paste form) or other particles (including those available as tailings in a pumpable slurry/paste form) are dewatered to water content of less than 20 wt-%. This dewatering step can be realized with use of a filter press or any other water removal equipment including dryers. Typical filter press for this use may be Outotec Larox® filter. The purpose of this step for the small particles or other particles, if available as a slurry, is to reduce their water content, which is in the range of 20 and 70 wt-%, to a level suitable for the downstream size enlargement step (pelletization step), i.e. typically below than 20 wt-% and more preferably below 15 wt-%. Thereby, the small particles and/or other particles can be pelletized, also without mixing of small calcine particles, while the formed pellets during the subsequent pelletitzation step are stable. In the case of a filter press, produced filtrate can be used as a moisturizer/binder in the separate pelletizing step. Further, this water can be used as process water e.g. in the evaporative cooler (if applicable) or other consumers. An alternative to a filter press could be the utilization of a material centrifuge or thickener in combination with use of flocculants and chemical additives.

A further alternative for de-watering small particles (i.e. small concentrate particles and/or other particles) or other particles to achieve a moisture value of below 20 wt.-%, preferably below 15 wt.-%, is using a dryer. A combustion gas can be used a heat source, while heat transfer may occur by direct contact with combustion gas or indirectly via a heat exchange surface. The heated gas can also come from a calcine cooler or any other heat exchanger device in the gas stream cleaning.

In a preferred embodiment of this invention, utilization of de-watering can be avoided by obtaining the required moisture for the subsequent pelletization of below 20 wt.-% and even more preferably of below 15 wt.-% through mixing. This can be achieved by mixing the small particles (which may be available as tailings) or other particles (which may be available as tailings) in form of slurry or paste with a moisture of 20-70 wt.-%, more preferably between 20-35 wt.-% with small calcine particles which maybe are present as dust and have a water content of between 0 and 3 wt.-%, since they have been treated within the roaster thermally. Alternatively, further particles, preferably having a low level of moisture of 0 to 3 wt.-%, e.g. sand, may be used for the purpose of avoiding de-watering equipment. Thereby, stable pellet formation is achieved without de-watering equipment utilization. The more preferred moisture range of 20-35 wt.-%, regarding the small particle stream and/or other particle stream, is more easily achieved in case of re-pulping of tailings existing as semi-dried solids, since the end moisture can be controlled during the re-pulping process through water addition.

Mixing of the small concentrate particles and/or other particles with small calcine particles and/or further particles may take place in the pelletizer itself or in separate mixing equipment. In the above case the analogies of mixing between the small particles or respective tailings (i.e. small concentrate particles) and/or other particles or their respective tailings (i.e. resulting from hydrometallurgical processing) with small calcine particles is given by (i) the mixture pelletization moisture, i.e. the moisture that allow pellets (granules) formation which is typically below 20 wt.-% and more typically below 15 wt.-%, as discussed above and (ii) the roaster heat balance, considering that small calcine particles are essentially an inert solid.

However, even in the case described in the paragraph above, i.e. where small particles (or their respective tailings) and/or other particles (or their respective tailings) are supplied in the form of slurry/paste in order to mix with small calcine particles and/or further particles, any of the above de-watering steps are possible (including filter press, centrifuge, thickener or dryer) in order to minder the moisture of the aforementioned small particles or other particles. This may be the case if the moisture of the small particles (or their respective tailings) and/or other particles (or their respective tailings) is too high for mixing with small calcine particles and/or further particles at an allowable mixing analogy. Too high moisture of the small particles (or their respective tailings) and/or other particles (or their respective tailings) would lead to a too high amount of small calcine particles and/or further particles required for achieving the mixing moisture for the pelletization step of below 20 wt. % and preferably below 15 wt.-%. This would lead to problems regarding availability and roaster heat balance. Preferred, mixing ratios between small particles and small calcine particles are in the range of 0.1-10 and more preferred between 1 to 2.

As discussed, the pelletization step requires at a moisture level between 8 and 20 wt.-% and more typically between 10 and 15 wt.-%. During pelletization of small concentrate particles and/or other particles, having a typical moisture level of 6-10 wt.-%, water or any other liquid addition may be required to reach the desired pelletization levels. On the other hand, since calcine particles are present as dust (i.e. have a moisture value of 0-3 wt.-%), the moisture value below 20 wt.-% can be achieved through the addition of water or any other liquid.

Further, it is possible to granulate a mix of small concentrate and/or other particles and small calcine particles in a similar manner.

Moreover, in the case of slurry concentrate feeding, which is typical in the case of roasting of gold bearing ores, pelletization may take place through the addition of part of the concentrate particles stream fed to the roaster which, as discussed has a moisture value of 20-70%. Hence, such a stream can be combined for pelletization of small calcine particles and/or other particles (including their tailings) and/or further particles at the appropriate moisture. Utilization of the concentrate particles in such a way has the additional benefits that water consumption is minimized since no further liquid addition (which has a negative impact on the roaster heat balance) is required for pelletization, other than that contained in the slurry, and that small calcine particle formation is also minimized since part of the concentrate particles are pelletized.

A further possibility, in the case of slurry concentrate feeding, is that the small particles tailings as well as other particles (including their tailings) can be processed as slurry, the moisture value of which can be set (e.g. during re-pulping) to a value that facilitates material transport. The tailings can then be mixed with the concentrate particles within the concentrate thickener from where they are directed to the slurry tank and roaster. Alternatively, should the additional tailings stream have a negative impact on the concentrate thickener performance in terms of e.g. thickener overflow clarity, the re-pulped tailings stream may be added to the slurry tank directly at a ratio that does not increase the water content within the slurry such that the roaster heat balance is not challenged in terms of maintaining proper process temperature.

Further, it is preferred to operate the pelletizing process in batch mode. This requires at least one buffer and one dosing system. Batch mode will lead to a higher product quality. This is justified since narrower particle size distribution (i.e. 80% of pellets below 3 mm to ensure pellet fluidization and even more preferably 80% of pellets below 0.5 mm for good solid circulation when utilizing a Circulating Fluidized Bed roaster) and higher solid density (associated to pellet stability) of the produced pellets can be achieved in batch mode. This is justified, since during batch mode all particles remain in the pelletizing equipment the same amount of time and undergo uniform processing, whereas during continuous operation a residence time distribution exists. Thereby, continuous processing leads to some particles being processed for a too short period resulting to too small and too weak pellets as well as some oversized pellets.

Based on arrangement issues, the buffer system may consist of one or more buffer bins followed by one or more dosing bins. Buffer/dosing bins with compartments may also be used to avoid building numerous bins. The number of buffer/dosing bins and their compartments will also depend on the amount of materials to enter the pelletizing step as dry solids or wet solids with a moisture of less than 20 wt.-% more typically below 15 wt.-%. Based on the description of the invention embodiments described herein such solids could be (i) small concentrate particles (small particles) (ii) other particles resulting from hydrometallurgical processing (e.g. from the direct leaching (DL) or the Pure Jarosite (PJ) process or Albion process or pressure oxidation (PDX) or biological oxidation (BIOX), before or after cyanide leaching in the case of gold, or other residues) (iii) small calcine particles, (iv) solid binders or (v) further particles, e.g. use of any type of calcine particles and/or sand for controlling the pelletization moisture and/or utilization of unseparated concentrate particles for distributing better the sulfur contained in other particles and thus avoiding un-controlled sulfur oxidation as described above. The buffer bin(s) ensures that feed material remains available, while the dosing bin compartment(s) has the purpose to release a pre-measured feed material quantity at the required time in respect to the pelletization step. Discharge of the buffer bin solids may be aided through a discharge device aiming at mechanical agitation which may or may not employ a series of rotating screws or rotating equipment. Discharge of the buffer bin may be facilitated by pressure air guns, tumbling hummers, or vibrators.

Moreover, the number of dosing bins or dosing bin compartments will depend also in the way of feeding of the above solids to the granulator, e.g. when mixing a slurry (or in some cases paste) feed with small calcine particles, small calcine particles addition may be required in more than one charges to enhance the mixing process. The dosing bin(s) act(s) as a dosing vessel for the subsequent pelletization equipment. Thereby, material included in the dosing bin(s) must be controlled. Hence, the dosing bin(s) must employ a respective solid inventory measurement method (kg), such as placing the dosing bin(s) on weight cells. The dosing bin is followed by a downstream valve capable of discharging the content of the vessel compartment(s) within seconds so as to facilitate operation of the pelletization equipment. Dosing operation is facilitated when the dosing bin is fed through an upstream high speed feeder, which may include a high speed conveyer or high speed screw conveyor. Discharge of the buffer bin may be facilitated by pressure air guns, tumbling hummers, or vibrators.

As mentioned in the paragraphs above the slurry/paste feed to the pelletizing equipment may include (i) small particles including tailings residues (tailings) or (ii) concentrate particles or (iii) other particles resulting from hydrometallurgical processing and (iv) a mixture thereof. The slurry/paste feed is fed to the pelletization step via dedicated nozzles and acts effectively as a liquid, moisturizer/binder.

Moreover, it is a subject of the invention that the liquid binder used in the pelletizing equipment which comprises water, or an aqueous solution containing sulfates and/or low acid concentration. Such addition increases stability of produced pellets by further chemical bonds, thus enhancing pellet stability. An example, of such a liquid in zinc production is weak acid from the electrolytic circuit.

Additionally, a solid binder can be added which preferably includes solids from a device gas-solid-separation device, i.e. an evaporative cooler, or a waste heat boiler or an electrostatic precipitator. These solids exhibit typically high sulfate sulfur content in the range of 1-5 wt.-% and have an average particle size of 5-100 µm, the sulfate content being formed due to favorable process conditions in these equipment in terms of oxygen partial pressure and temperature. In other words, the small calcine particle processing proposed here, increases pellet stability since the processed solid is a binder itself.

Moreover, it is preferred to add further particles like calcine particles and/or sand for controlling the pelletization moisture. In addition or alternatively unseperated concentrate particles can be used as further particles for better distributing the sulfur contained in other particles and thus avoiding un-controlled sulfur oxidation as described above Batch phases have duration of below 1 hour, more preferably between 3 and 15 minutes.

Further, it is preferred to feed the pellets into the roaster as wet solids of below 20 wt.-% moisture and without a slurry preparation. Such feeding is termed as "dry feeding". Slurry feeding of pellets to the roaster would be detrimental for their stability since they would partially decompose to their primary grain.

Downstream of the roaster at least parts of the calcine is typically leached in leaching using a solution with an acid content leading to pH value of 2 or less, preferably 1 or less, and/or is leached in a cyanide solution or is smelted or enters an electric furnace.

Basically, leaching is a process where ore calcine is soluble and impurities are insoluble. Leaching is used in extractive metallurgy as a technique which converts metals into soluble salts in aqueous media. In leaching, a high sulfide sulfur and/or carbon—in the case of gold—leads to reduced metal recovery, while sulfate sulfur leads to processing difficulties explained above, e.g. in the case of zinc to a higher bleed form the electrolytic circuit which has to be neutralized, the latter being associated to cost. Using a furnace, a high sulfide and/or sulfate sulfur and/or carbon content could lead to heat balance problems in a smelter utilizing also further concentrate feeds.

Moreover, a preferred embodiment of the invention is a milling and/or grinding of at least part of the calcine particles passed to downward process stages. This is due to the fact that for later process steps, and especially during leaching, smaller average diameters are preferred. So, the increasing of the average diameter caused by the pelletizing is reversed.

Such a plant features a fluidized bed roaster for similar treatment of concentrate particles at temperatures between 500 and 1200 ° C., preferably 600 to 950 ° C., to form a calcine. Further, such plant features at least one solid fraction conduit for withdrawing the solid fraction from the roaster and a gas-solid fraction conduit for withdrawing a gas-solid fraction from the roaster.

It is preferred that the plant also contains a particle separating device for separating concentrate particles with a diameter at least 50% smaller than the average diameter of the concentrate particles and/or at least one gas separating device for separating particles from the gas-solid fraction as small calcine particles from the gas stream with the intention of recycling them to the roaster after processing as described herein. In addition, it is preferred that the plant contains a hydrometallurgical device for gaining particles as other particles with the intention of directing them to the roaster after processing as described herein.

Further, the plant according to the invention contains a pelletizer wherein the small particles and/or the small calcine particles and/or the other particles and/or further particles are mixed with a liquid binder to form pellets. Thereby, at least 80 wt-% of the pellets features a diameter of at least 80% of the concentrate particles average diameter and that 80% of the pellets have preferably particle size lower than 3 mm, and even more preferably 40-80% have a particle size lower than 0.5 mm for good recirculation especially for a circulating fluidized bed roaster. Moreover, a recycling conduit from the pelletizer into the roaster is foreseen. Thereby, it is possible to ensure that particles containing less sulfide and/or sulfate sulfur and/or carbon containing particles are fed into a later process step like leaching.

A preferred embodiment of the inventive plant features a bubbling fluidized bed as a roaster for a very homogeneous heat and mass transfer. However, also a circulating fluidized bed reactor is possible.

In the case of a bubbling fluidized bed reactor, part of the resulting calcine exits the roaster through the overflow exit and/or underflow exit. (in both cases through a discharge device) located near the bottom part of the reactor. In the case of a circulating fluidized bed roaster, an exit is located at the seal pot which is also equipped with a discharge device. Afterwards the product (calcine) enters cooler, which may be a fluidized bed and may or may not have bundles for indirect heat removal and may or may not utilize direct cooling through water injection. The aforementioned discharge device may include a configuration utilizing a cone valve, rotary valve or screw feeder. The cooler according to the above definition may include, but is not limited to, a fluidized bed-, sectional-, rotary drum-cooler type.

The pelletizing device itself contains a low or high shear mixer, a tumbling-disc or fluidized bed granulator or any other size enlargement equipment.

A preferred embodiment of the invention foresees a high shear mixer as the pelletizer. A high shear mixer operated in a batch mode is most preferred due to the quality of the product, especially a very small distribution of the resulting pellets diameter and a compact pellet density leading to high pellet stability.

Further, the gas-solid separating device is an evaporative cooler and/ or a waste heat boiler and/or cyclone(s), connected in parallel or in series, and/or an electrostatic precipitator. A bag filter or multi-cyclone (multi-cyclone) arrangement might also be utilized as a gas-solid separating device.

Coarse calcine pellets and coarse calcine particles are removed from the fluidized bed via an underflow exit. This is preferred since some of the pellets or particles in the fluidized bed may be too large to fluidize properly. The significance of the underflow exit is even more pronounced in the case of a circulating fluidized bed, where pellets too large to circulate internally may lead to inability to evacuate produced calcine. In any case, without an underflow exit the roaster in the worst case would break down as a result of material accumulation.

In addition, the invention can be extended to sulfide ore roasting, i.e. roasting of ore that has not gone through a flotation circuit, with the purpose of recovering the wanted metal. Even more, the invention can be extended to a two-stage roasting process i.e. aiming at the removal additionally of arsenic, with the purpose of recovering the wanted metal. Such a case is particularly typical in the production of gold.

Moreover, the invention also encompasses treating calcine from a direct leaching process (DL), Pure Jarosite (PJ) process, Albion process, pressure oxidation plant (POX), biological oxidation (BIOX) plant, before or after cyanide leaching in the case of gold, or as other particles mentioned above, which may still contain organic carbon and/or sulfur and/or arsenic in the form of iron arsenates (scorodite) which may hinder the amount of metal recovery significantly. Hence, the aim hereto would be removal of organic carbon and/or arsenic and/or sulfur. The purpose hereto is to further recover the wanted metal from above materials, e.g. gold, zinc.

Further developments, advantages and possible applications can also be taken from the following description of exemplary embodiments and the drawings. All features described and/or illustrated from the subject matter of the invention per se or in any combination, independent of their inclusion in the claims or their back reference.

Figure 1:
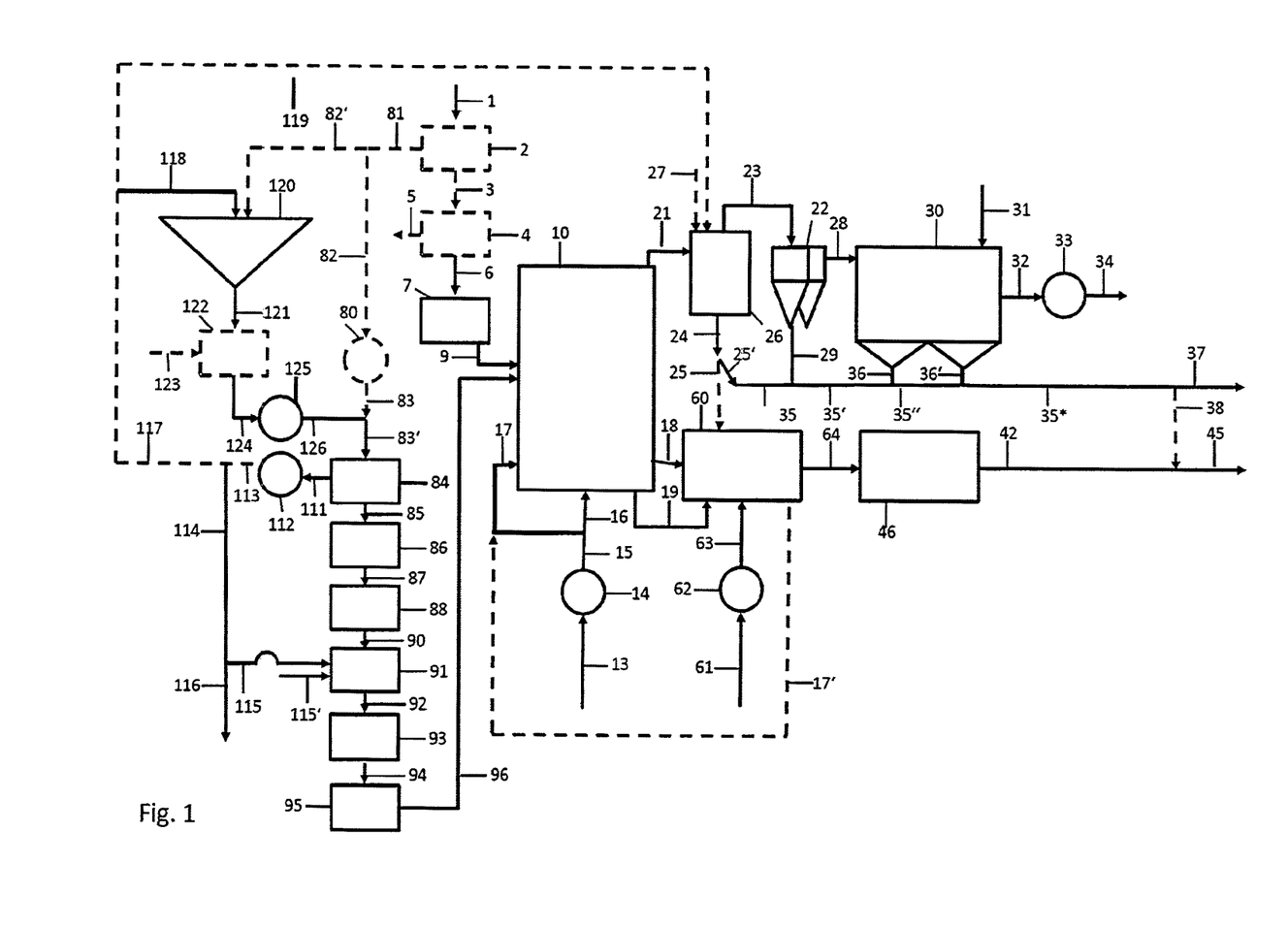
FIG. 1 a first embodiment of the invention including a separation of the small particles out of the concentrate particles including de-watering equipment for small particles (i.e. small concentrate particles) and dry feeding systems to the roaster for pellets and non-pelletized feed FIG. 2 a second embodiment of the invention including a separation of small calcine particles out of the gas-solid fraction and dry feeding systems to the roaster for pellets and non-pelletized feed FIG. 3 a third embodiment of the invention including the adding of particles gained in hydrometallurgical process and further particles and dry feeding systems to the roaster for pellets and non-pelletized feed FIG. 4 a fourth embodiment of the invention with a combination of both particle separations as well as the adding of other particles and dry feeding systems to the roaster for pellets and non-pelletized feed FIG. 5 a fifth embodiment of the invention with a combination of both particle separations where small particles separated out of the concentrate particles and small calcine particles separated out of the gas-solid fraction as well as an adding of other particles and dry feeding system to the roaster for pellets and slurry feeding systems for non-pelletized feed In FIG. 1, a feed of concentrate particles exiting the flotation circuit, or re-pulped concentrate, is fed via line 1 to a particle separation device 2, in detail a separation equipment, which may include an arrangement of multiple hydrocyclones thus allowing for separation of bigger particles by exerting a respective centrifugal force. From there, the bigger particles are passed via line 3 into a dewatering device 4, like a filter press. From there, it passes conduit 6, buffer 7 and conduit 9.

Via line 9, the dry feed is fed into the reactor 10 which is designed as a fluidized bed reactor. The off-gas exiting the roaster 10, includes a solid fraction, composed of small calcine particles.

The gas-solid fraction is passed via conduit 21 into a cooler 26, which may be a waste heat boiler or an evaporative cooler. In the case of an evaporative cooler, cooling medium is fed in via line 27. From there, the gas-solid fraction further passes via conduit 23 to two secondary cyclones 22 connected in parallel wherein part of the small calcine particles are separated (coarser fraction) from the gas flow. Afterwards, the gas stream is passed via line 28 into an electrostatic precipitator 30, wherein air for protecting the insulators is added through line 31. The gained particles from the cooler 26 may be optionally passed to the calcine cooler 60 through lines 24, 25 and from there to a mill 46 via line 64.

Alternatively, the calcine from the cooler 26, the calcine from the secondary cyclones 22 and/or the electrostatic precipitator is transferred to the plant battery limits (e.g. to leaching) via lines 24, 25', 35, 29, 35', 36, 35", 36', 35* and 37. Via conduit 38, it is possible to mix these particles with the particles of conduit 42 and pass them to the further process step via conduit 45.

The resulting gas fraction is passed via line 32 through an intermediate fan 33 and line 34 into a further (not shown) gas cleaning and potentially sulfuric acid plant production section.

The roaster 10 is designed as a fluidized bed reactor. Therefore, fluidizing gases like air for oxidation of sulfide sulfur and organic carbon is passed via line 13, blower 14, line 15 and 16 into the roaster 10 as a fluidizing gas. Gas is optional also inserted via line 17 as secondary gas.

It is also possible to have further gas inlets (not shown) utilizing the blower 14 or further blowers. Via conduit 18, 19 it is also possible to withdraw parts of the calcine particles out of the fluidized bed within the roaster 10. Conduit 18 is known as an overflow exit in the case of a bubbling fluidized bed roaster, while conduit 19 is known as the underflow exit. Preferably, the withdrawing takes place through conduits 18, 19 which are located at the bottom and side of the reactor, respectively. Also conduit 18 (overflow exit) is preferred to be located close to the nozzle grid used for the homogeneous distribution of the gas stream 16, however placed at such distance that allows sufficient solids inventory in the roaster bed. The location of conduit 18 essentially marks, within a bubbling fluidized bed roaster, the boundary between the roaster dense phase (bubbling bed), which is rich in solids, and the freeboard, which is lean in terms of solids concentration. The purpose of line 19 (underflow exit) is to be able to discharge roaster pellets or other oversized calcine particles that are too large to be entrained with the gas flow to line 21, or to exit through the overflow exit 18 in case of a bubbling fluidized bed roaster. Conduits 18 and 19 areE optional designed as an overflow or underflow line respectively, equipped with a discharge device to downstream equipment. The oversized particles and particle that exit though the overflow exit pass to the calcine cooler 60 via lines 19, 18 respectively. The cooler 60 can be designed as a fluidized bed cooler. In this case, fluidizing gas like air is introduced via blower 62 and relating conduits 61 and 63. Further, it is also possible to use the fluidizing gas afterwards as a secondary gas, which would be passed via dotted conduit 17' into conduit 17 and from there into the reactor 10.

From the cooler 60, the particles are further fed via conduit 64 into the mill 46. To reduce the average particles' diameter for a later process step, e.g. a leaching step.

The essential point is that in the particle separating device 2, smaller particles separated and passed via line 81, 82 into a slurry pump 80. In absence of a downstream equipment, the small particles can be transported in a slurry form, termed as "tailings" as discussed above, to the tailings pond/dam or area 120 via lines 81, 82'. In case of normal operation small particles are passed from the slurry pump 80 via lines 83, 83' into a de-watering device 84. From there, dewatered solids are passed into a buffer 86 via line 85. From there line 87 leads to a dosing system 88. After that, line 90 feeds particle into the pelletizer 91 and from there via line 92 into an additional buffer 93. From there, line 94 brings the pellets into a feeding device 95 and from there via line 96 to the roaster 10 and more specifically at the bottom, center or top of the reactor.

Water from the de-watering device 84 is fed via line 111 into a pump 112. From there, water is fed into the pelletizing device 91 via lines 113, 114 and 115 where it is used as a moisturizer/binder. Further, water is withdrawn via lines 113, 114 and 116. Alternatively, the filtrate can be used as cooling medium in the evaporative cooler (if applicable) through lines 113, 117 and 119. Also, filtrate water can be fed via lines 113, 117 and 118 into a tailings pond/dam or storage area 120. Such a connection replaces water evaporated in the above mentioned pond, dam or storage area, thus keeping the contained tailings as pumpable slurry/paste. Extra liquid binder/moisturizer can be added to the pelletizer via line 115' to set the desired pellet moisture value.

The tailings pond/dam or area 120 serves the purpose of storing tailings in case that equipment 84, 86, 88, 91, 93, 95 are momentarily not in service or not yet installed.

From the tailings pond/dam or area 120, particles pass via line 121 potentially to a re-pulper 122 which may or may not be required depending on the condition of the tailings (thus represented with a dotted line), i.e. if they are available as pumpable slurry/paste or as not pumpable paste. The latter is associated with the material properties of the tailings, the time of storage within tailings pond, dam or area 120 and the evaporation rate of water which depends also on local weather conditions. For re-pulping tailings to a pumpable slurry/paste a liquid phase is required, e.g. water, added through line 123. The re-pulped pumpable slurry/paste is then transferred to a slurry pump 125 via line 124 and from there into line 83' via line 126. Hence, operation may take place with a "fresh feed" of small particles generated in the particle separation device 2 or though already separated small particles originating from the tailings pond, dam or area 120.

Figure 2:
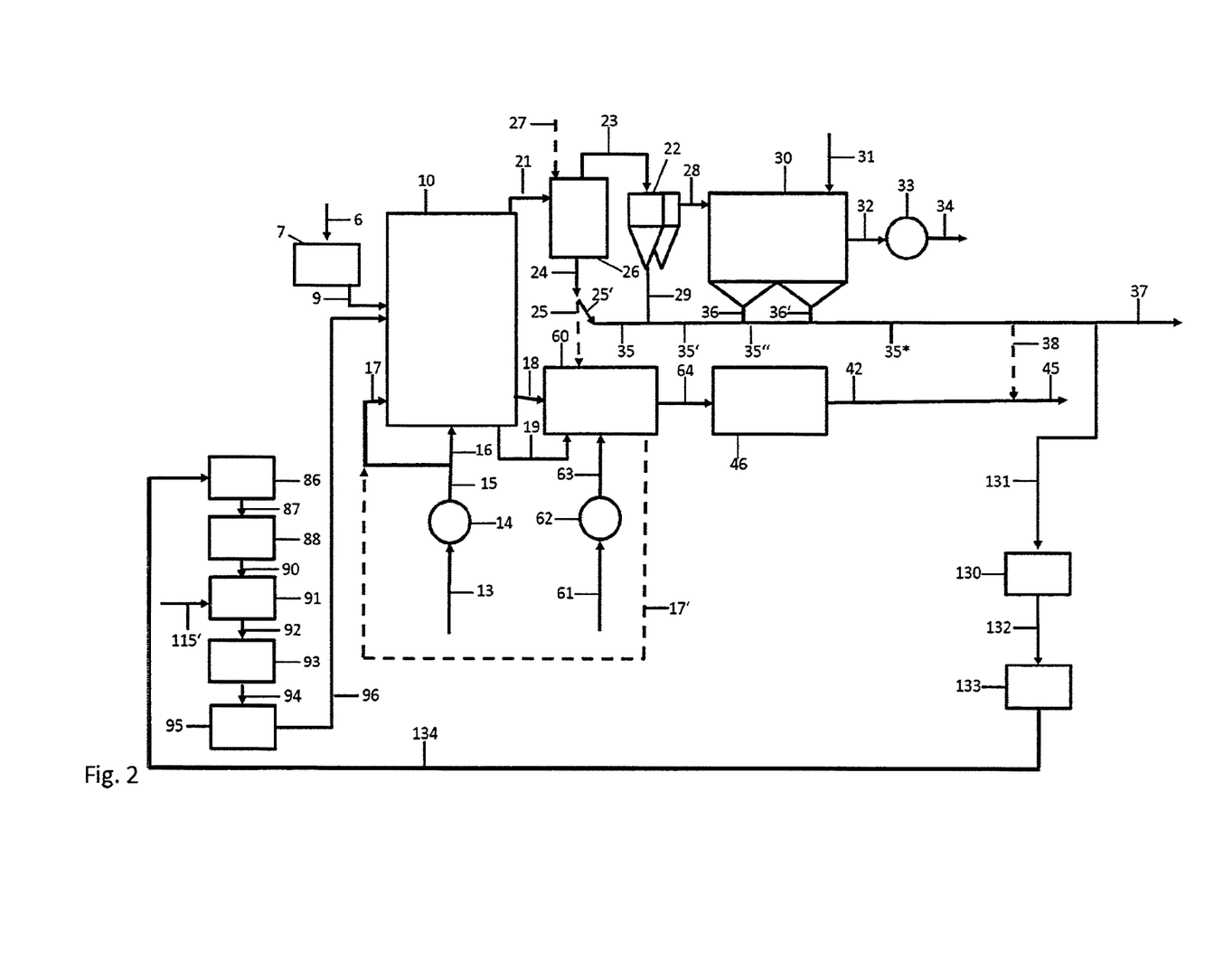

FIG. 2 shows an identical design of the reactor 10 and its periphery, but without a separation of small particles. Instead, particles from the cooler 26 (optionally), the cyclone(s) 22 and/or the electrostatic precipitator 30 are passed from conduits 24, 25', 35, 29, 35', 36, 35", 36' and 35* via conduit 131 to the rotary drum cooler 130 (or other type of cooler).

It should be noted that typically small calcine particles separated from the cooler (26) are coarser than the rest of the small calcine particles and have therefore a more favorable chemical composition thus potentially allowing discharge to the product stream via lines 24, 25. Solids from the secondary cyclones 22 are transferred to the rotary drum cooler 130 (or other type of cooler) via lines **29, 35', 35", 35*, 131. Solids from the electrostatic precipitator are transferred to the rotary drum cooler 130 (or other type of cooler) via lines 36, 36', 35", 35*, 131**.

From there particles are transferred to a conveying system 133 via line 132 and subsequently via conduit 134 to the buffer 86. Line 87 leads the particles to a dosing system 88. After that, particles are fed via line 90 into the pelletizer 91 and from there via line 92 into an additional buffer 93. Since the small calcine particles feature low or no water content, a liquid moisturizer/binder is added to the pelletizer 91 via line 115'. From the pelletizer 91, the pellets are transported via line 94 into a feeding device 95 and from there via line 96 to the roaster 10 and more specifically at the bottom, center or top of the reactor. So, it is also that some or all of the gained solids from the cooler 26 (which may be a waste heat boiler or evaporative cooler), secondary cyclones 22, and electrostatic precipitator 30 may be purged from being recycled to the roaster 10 via lines 25 or 37 or 38, 45 due to e.g. roaster heat balance considerations caused e.g. by a lower than expected heating value of the concentrate particle feed entering the system via line 6.

Figure 3:
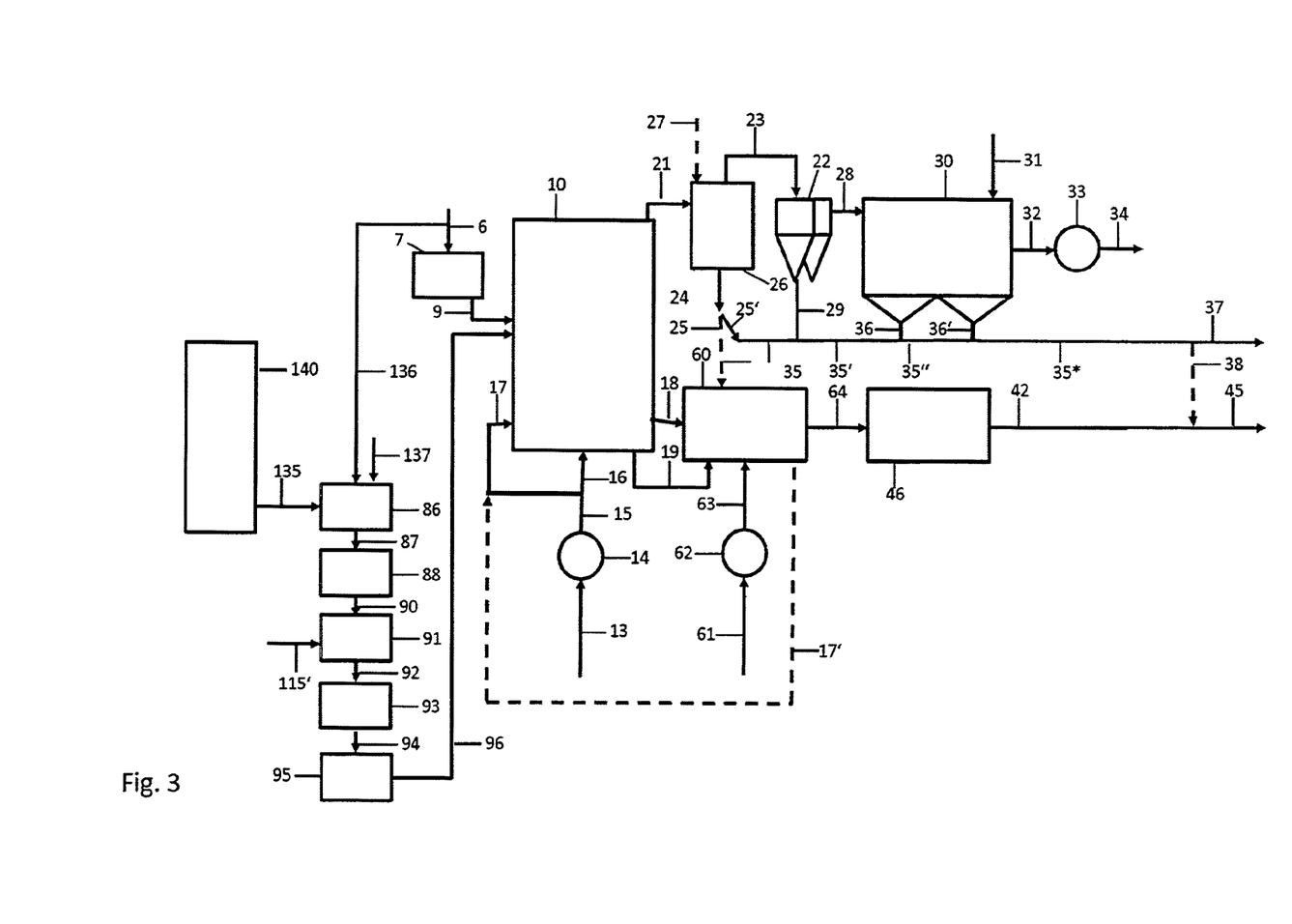

FIG. 3 shows that it is also possible to add particles from another process stage 140, like direct leaching (DL), Pure Jarosite (PJ) process, the Albion process, pressure oxidation (PDX), biological oxidation (BIOX), before or after cyanide leaching in the case of gold, via conduit 135 into buffer 86.

Moreover, the arrangement is shown where the other particles from the hydrometallurgical device 140 are mixed within the buffer bin with further particles, i.e. concentrate particles undergoing no separation through conduit 136 or other particles such as sand or calcine particles through conduit 137.

In addition, other particles could be also utilized alone, e.g. depending on their sulfur content. Hence, an additional heat source may be required to achieve roasting temperatures, other than that resulting from sulfur and carbon oxidation contained in the other particles. Hence, any type of fuel may be inserted to the system, either directly to roaster 10, or within the incoming air stream flow.

The design depicted in FIG. 3 corresponds to a system where the particles added from the above process stage (i.e. the hydrometallurgical device 140) are readily available as wet particles having a moisture below the appropriate pelletization moisture. Should these particles be available as slurry/paste or as tailings in a pumpable or not pumpable slurry/paste form then similar arrangement can be employed as that shown in FIG. 1 for dewatering small particles and for storing and repulping small particle tailings.

Figure 4:
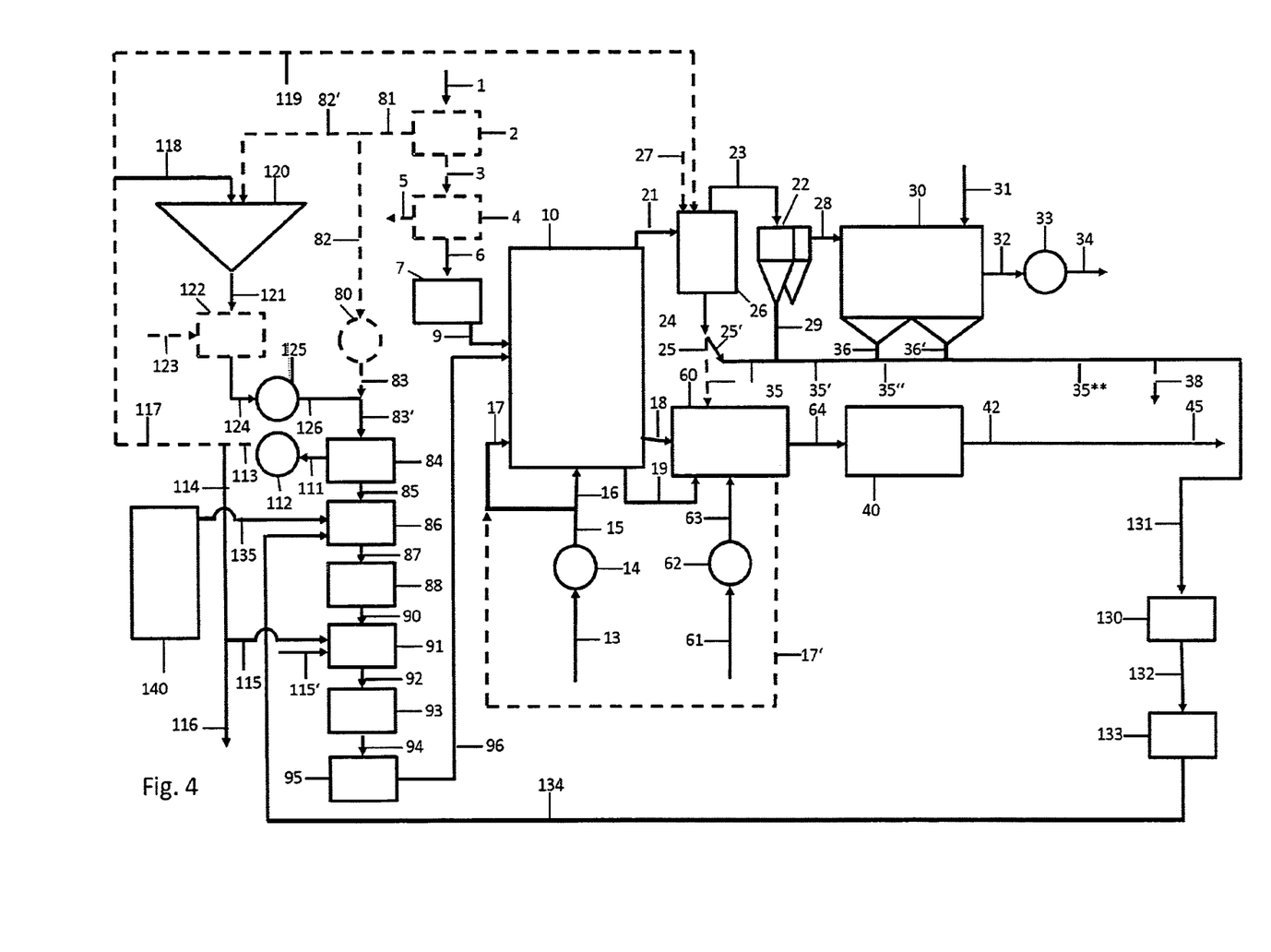

FIG. 4 shows a combination of all sources of particles for pelletization, namely the separation of the small concentrate particles, the at least partly recycling of the small calcine particles and the adding of particles from another source.

Also here, the design depicted in FIG. 4 corresponds to a system where the particles coming from a hydrometallurgical process stage (i.e. the hydrometallurgical device 140) are readily available as wet particles having a moisture below the appropriate pelletization moisture. Should these particles be available as slurry/paste or as tailings in a pumpable or not pumpable slurry/paste form then similar arrangement can be employed as that shown in FIG. 2 for dewatering small particles and for storing and repulping small particle tailings.

Figure 5:
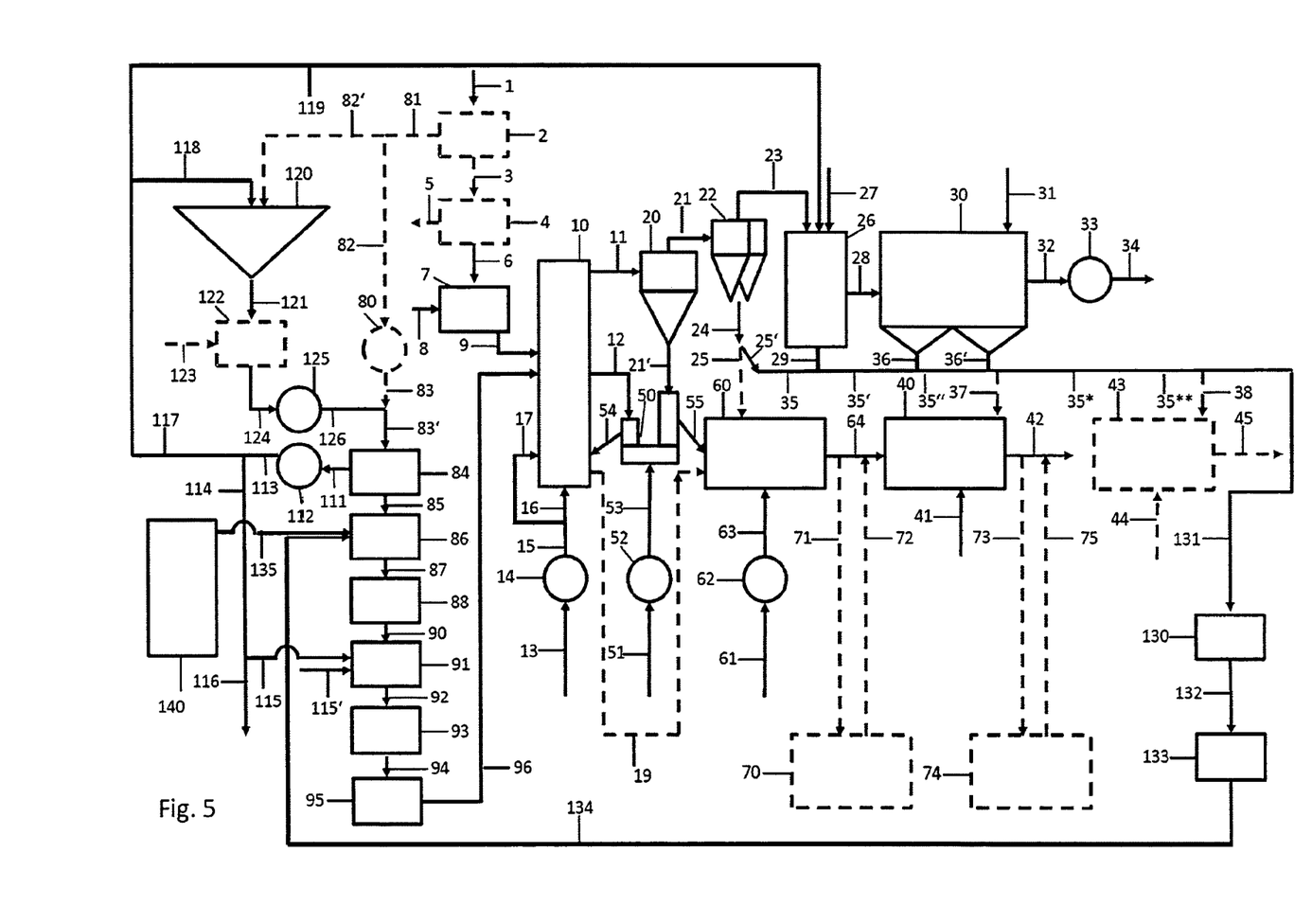

FIG. 5 shows a design for separating, pelletizing and feeding to the roaster small calcine particles as a slurry, which is particularly important for gold roasting.

Concentrate particles slurry enters the separation device 2. The bigger particles enter the thickener 4 via conduit 3. From thickener 4, the thickener overflow stream (line 5) may be used from process water consumers (e.g. evaporative cooler 26, connection not shown). Through line 6 the thickened concentrate is directed to a slurry tank/slurry distribution box arrangement 7, wherein the water content of the slurry is adjusted to allow for temperature control within the roaster 10. Water addition is carried out via line 8, while slurry enters the roaster 10 through conduit 9. The separated small particles, exiting the separating device 2 through line 81, or respective tailings, are treated in the same manner as described for FIG. 1 and hence a detailed description is omitted here.

Moreover the small calcine particles are separated potentially from the secondary cyclones 22, from the evaporative cooler 26 as well as the particles collected the hot electrostatic precipitator 30. Gained solids from the secondary cyclones 22 are transferred to a rotary drum cooler 130 (or other type of cooler) via lines 24, 25', 35, 35', 35", 35*, 35**, 131.

It should be noted that typically small calcine particles separated from the secondary cyclones, in the arrangement shown in FIG. 5, are coarser than the rest of the small calcine particles and contain a lesser content in terms of organic carbon thus potentially allowing discharge to the product stream via lines 24, 25. Solids from the evaporative cooler 26 are transferred to the rotary drum cooler 130 (or other type of cooler) via lines 29, 35', 35", 35*, 35**, 131. Solids from the electrostatic precipitator are transferred to the rotary drum cooler 130 (or other type of cooler) via lines 36, 36', 35", 35*, 35**, 131. However, depending on arrangement issues line 19 could be directed directly to quench 40 or to a separate quench (not shown). Via line 41, quench water is added so as to cool solids and obtain a pumpable slurry.

From the rotary drum cooler particles are transferred to a conveying system 133 via line 132 and subsequently to the buffer 86. Line 87 leads the particles to a dosing system 88. After that, particles are fed via line 90 into the pelletizer 91 and from there via line 92 into an additional buffer 93. Should the mixing moisture of small particles and small calcine particles be below that required for pelletization, a liquid moisturizer/binder is added to the pelletizer 91 via line 115'. From the buffer 93, the pellets are transported via line 94 into a feeding device 95 and from there via line 96 to the roaster solid transport system (loop seal) 50 or alternatively directly at the roaster 10 and more specifically at the bottom, center or top of the reactor. So, it is also that some or all of the gained solids from the secondary cyclones 22, evaporative cooler 26 and electrostatic precipitator 30 may be purged from being recycled to the roaster 10 via lines 25, 37 or 38 due to e.g. roaster heat balance considerations caused e.g. by a lower than expected heating value of the concentrate particle feed entering the system via line 1.

Lines 35*, 35**, dotted line 38 show the possibility to direct the calcine from the spray cooler and electrostatic precipitator to a separate quench 43. Via line 44, quench water is added so as to cool solids and obtain a pumpable slurry. The quench particles are fed via line 45 later process steps like a cyanide leaching.

Additional dotted lines 71, 72 shows the possibility to pass particles into a calcine dry mill 70. Particles are then fed back into line 64 via line 72.

Further dotted lines 73 and 75 show an option to lead the particles via line 73 into a wet grinder 74 and back via line 75 into line 42. From there the particles are directed to downstream processes like cyanide leaching. If required (not shown), a similar dry grinding- and wet grinding apparatus can be used prior and after the further quench (43), respectively.

Also in the case of FIG. 5, the layout depicted corresponds to a system where the particles added from the above process stage (i.e. the hydrometallurgical device 140) are readily available as wet particles having a moisture below the appropriate pelletization moisture. Should these particles be available as slurry/paste or as tailings in a pumpable or not pumpable slurry/paste form then similar arrangement can be employed as that shown in FIG. 1 for dewatering small particles and for storing and repulping small particle tailings.

Example 1

A first example is given here. A zinc producer may combine a Direct Leaching plant and/or a Pure Jarosite (PJ)

plant and a roasting plant as part of his zinc production chain. It would be favorable to combine the operations so as to not dispose of direct leach and/or Pure Jarosite (PJ) residue and to recover the contained lead and silver. In addition, sublimation and evaporation as well as uncontrolled burning of the sulfur contained in the residue should be avoided. The drawing presented in FIG. 3 is an option to utilize. The hydrometallurgical device 140 would correspond to a Direct Leaching (DL) plant and/or a Pure Jarosite (PJ) plant. The Direct Leaching (DL) residues and/or Pure Jarosite (PJ) residues correspond to the other particles as defined herein. They contain an average sulfur content of 50 wt.-% and contains 4 wt.-% lead and 400 g/t silver. The particles are received after a filter press integrated in the Direct Leaching (DL) plant and/or Pure Jarosite (PJ) plant and exhibit a moisture of 20%, hence they can be added directly within the buffer bin 86 via line 135. To avoid the above mentioned issues with regard to the sulfur contained in the sulfur residue, granulation of the Direct Leaching (DL) and/or Pure Jarosite (PJ) residues with further particles, i.e. concentrate feed through line 136, is realized. Thereby the sulfur contained in the leaching residue is homogenized and is encapsulated which leads to optimum oxidation behavior within the bed. Hence, leach residue particles, as other particles, and zinc concentrate particles undergoing no separation, as further particles, having an average particle size of 40 μm and a sulfur content of 40 wt.-% are co-pelletized within the pelletizer 91 and are then reacted within roaster 10, according to the drawing of FIG. 3. Thereby, the sulfur combustion/conversion issues related to the other particles are avoided.

Example 2

As a second example, gold producer who may operate a biological oxidation plant to treat refractory gold concentrates may find it challenging to cope with increasing organic carbon and arsenic in the material directed to cyanide leaching. Typical composition of such material may be in the range of 2-5 wt.-% of sulfide sulfur, 1-3 wt.-% of organic carbon and 0.5-1.5 wt.-% of arsenic and 15-25 g/t of gold and an average particle size of approximately 20 μm. Alternatively, the producer may consider to utilize material which has been processed within both a biological oxidation stage and cyanide leaching. Such material may exhibit following chemical composition, i.e. 2-5 wt.-% of sulfide sulfur, 1-3 wt.-% of organic carbon, 0.5-1.5 wt.-% of arsenic and 5-15 g/t of gold and an average particle size of approximately 20 μm. In both cases BIOX treated particles, before or after the cyanide leaching stage are granulated because of their particle size distribution which would lead to noted conversion problems (due to limited residence time) regarding sulfur, carbon and arsenic conversion as discussed herein and then fed to the roaster. This can be realized according to the drawing of FIG. 3. The other particles discussed in this invention would then correspond to the BIOX particles, before or after cyanide leaching. These other particles can be roasted alone, however under the addition of fuel directly in the roaster, or within the airline 15 directing air to the roaster. The purpose is of course to oxidize sulfur, carbon and potentially arsenic so as to enable a higher gold recovery. Due to pelletization, sufficient residence time will be made available to allow for conversion of above mentioned elements within the roaster. Arsenic removal may necessitate further or prior treatment at a reducing or neutral atmosphere.

Example 3

A third example can be given in the case of copper, e.g. when roasted partially, i.e. at under-stoichiometric conditions with regard to oxygen. The small calcine particles may contain significant amount of arsenic, i.e. around 6 wt.-%. Hence, they may be recycled to the roaster, according to the schematic of FIG. 2 (after passing through a cooler 130, a buffer 86 and a pelletizer 130). Within the roaster a residual conversion of below 0.3 wt.-% arsenic can be achieved for the small calcine particle granules.

Example 4

A fourth example is discussed below. A zinc producer, acid producer through pyrite roasting, copper and/or cobalt producer, nickel producer, PGM producer all utilizing a bubbling fluidized bed roaster for their roasting operations, i.e. to oxidize sulfur, are frequently facing following issue. The sulfate sulfur of the small calcine particles separated is often around 3-4 wt.-% when handling, the ever more present fine concentrates having an average particle diameter of approximately 25 μm. The above described probles leads to significant cost within the leaching circuit as has been explained herein.

This problem can be solved with the flowsheet of FIG. 2. Recycling of all small calcine particles through cooler 130 and eventually pelletizing them in the pelletizer 91 before adding them to the roaster allows effectively that no small calcine particles are directed to leaching. Thereby, only material exiting through the overflow or underflow exits will be directed to leaching, which is low in sulfates (e.g. approx. 0.3 wt.-% depending on impurities) because of the fact that sulfation of several components, e.g. iron, is not thermodynamically favored. Hence, the costs within the leaching circuit are minimized.

Example 5

A fifth example is discussed below. It refers to the same producers, as discussed in the third example discussed above. As a result of the fine concentrate handled, having an average diameter of 25 μm significant temperature differences between roaster top and bottom are encountered (in the range of 200° C.). As a result capacity limitation, refractory lifetime issues and ferrite formation is being faced.

The solution is given within FIG. 1 of this invention. By separating within the particle separation device 2 particles below 12 μm, dewatering them in a filter press 84 before eventually pelletizing them in the pelletizer 91 and inserting them to the roaster 10 the problem is solved since pellets formed (<1 mm) do not oxidize in the upper part of the furnace but near the bottom as intended. As a result 100% of the plant capacity can be reached and the refractory lifetime specification remains valid throughout the roaster operation. Finally, temperature control becomes far easier thus minimizing ferrite formation as well.

Example 6

A sixth example can be considered for the case of a zinc producer. When necessitated to integrate Direct Leaching (DL) process and/or the Pure Jarosite (PJ) process with the roasting process as explained in the first example, when also necessitating to solve the issue of high sulfate content in the small calcine particles as explained in the fourth example and when further necessitating to solve the issue of temperature difference within the roaster as explained in the fifth example then a process according to the drawing of FIG. 4 would be most suitable. Thereby utilization of Direct Leaching (DL) residue and/or Pure Jarosite (PJ) and a calcine of low sulfide sulfur, below 0.1 wt.-%, and low sulfate sulfur, below 0.5 wt.-%, can be attained.

Example 7

Finally, in the case of gold roasting, the flowsheet of FIG. 5 would be most suitable. Thereby organic carbon in the calcine minimized. This maximizes gold recovery within the leaching step. This is realized by recycling small calcine particles from the secondary cyclones 22, spray cooler 26 and electrostatic precipitator 30 to the roaster 10 after passing through the cooler 130 and pelletizer 91. Thereby, the necessitated residence time is achieved within the roaster 10. This is further enhanced should the concentrate particles, having an average particle diameter of 50 microns, undergo separation within the separation device 2.

As a result a small particle stream, having an average particle size diameter of 20 microns can be achieved which can de-watered in the filter press and pelletized in the pelletizer together with the small calcine particles. As a result carbon containing particles receive the residence time necessitated to maximize carbon burn-out thereby maximizing gold recovery. Organic carbon levels in the calcine of below 0.2 wt.-% can be achieved.

LIST OF REFERENCES 1 conduit
2 particle separation device
3 conduit
4 dewatering device
5, 6 conduit
7 buffer
8, 9 conduit
10 roaster
11-13 conduit
14 blower
15-19 conduit
20 cyclone
21 conduit
22 secondary cyclone(s)
23-25 conduit
26 cooler
27-29 conduit
30 electrostatic precipitator
31, 32 conduit
33 fan
34-38 conduit
40 quench
41, 42 conduit
43 quench
44, 45 conduit
46 mill/grinding device
50 solid transportation system
51 conduit
52 blower
53-55 conduit
60 cooler
61 conduit
62 blower
63, 64 conduit
70 dry mill
71-73 conduit
74 wet grinding
75 conduit
80 pump
81-83 conduit
84 de-watering device
85 conduit
86 buffer
87 conduit
88 dosing bin(s)
90 conduit
91 pelletizer
92 conduit
93 buffer
94 conduit
95 feeding device
96 conduit
111 conduit
112 pump
113-119 conduit
120 tailing pond/dam or area
121 conduit
122 re-pulper
123, 124 conduit
125 pump
126 conduit
130 cooler
131, 132 conduit
133 conveying system
134 conduit
135-137 conduit
140 hydrometallurgical device

The invention claimed is:

1. A process for roasting of metal concentrate, wherein concentrate particles are fed into a roaster where they are thermally treated at a temperature in a range of 500 and 1200° C. in a fluidized bed to form a calcine, at least parts of the calcine are withdrawn from the roaster together with a gas stream as a solid fraction, particles are gained in another hydrometallurgical step as other particles, at least parts of the other particles are pelletized, whereby at least 80% of pellets feature a diameter of at least 80% of an average diameter of the concentrate particles and the pellets are fed into the roaster so that the metal concentrate contains at least 45 wt.-% zinc, whereby the average diameter of the concentrate particles is between 5 and 40 µm, the metal concentrate contains at least 60 wt.-% pyrite, whereby the concentrate particles' average diameter of the concentrate particles is between 5 and 90 µm, the metal concentrate contains at least 2 g/t gold, whereby the average diameter of the concentrate particles is between 5 and 100 µm, the metal concentrate contains at least 15 wt.-% copper, whereby the concentrate particles' average diameter of the concentrate particles is between 10 and 50 µm, the metal concentrate contains at least 1 wt.-% cobalt, whereby the average diameter of the concentrate particles is between 5 and 40 µm, or the metal concentrate contains at least 100 g/t Platinum-Group Metals (PGMS), whereby the average diameter of the concentrate particles is between 20-100 µm.

2. The process according to claim 1, wherein concentrate particles with a diameter at least 50% smaller than the average diameter of the concentrate particles are separated as small particles and pelletized together with the other particles, and/or small calcine particles, which are particles from a gas-solid-fraction separated in at least one step, are separated in a waste heat boiler, an evaporative cooler, a cyclone, and/or an electrostatic precipitator.

3. The process according to claim 1, wherein particles from a gas-solid-fraction are separated in at least one step as small calcine particles and are pelletized together with the other particles.

4. The process according to claim 1, wherein small particles, which are concentrate particles with a diameter at least 50% smaller than the average diameter of the concentrate particles, and/ or at least part of small calcine particles, which are particles from a gas-solid-fraction separated in at least one step, and/or at least parts of the other particles are pelletized such that at least 70 wt.-% are bigger than 500 μm or that at least 70 wt.-% are smaller than 90 μm.

5. The process according to claim 1, wherein an amount of sulfur and/or carbon in the concentrate particles is between 0.5 and 60 wt.-% and/or an amount of sulfur and/or carbon in small particles, which are concentrate particles with a diameter at least 50% smaller than the average diameter of the concentrate particles, is more than 20% higher than in the concentrate particles and/or an amount of sulfur and/or arsenic in small calcine particles, which are particles from a gas-solid-fraction separated in at least one step, is more than 15% higher than an average amount in all calcine particles and/or the small calcine particles contain at least 2 wt.-% sulfur.

6. The process according to claim 1, wherein secondary air is injected into the roaster which is heated to a temperature of at least 200° C.

7. The process according to claim 6, wherein at least parts of the calcine are cooled in a fluid bed cooler, whereby air used as direct and/ or indirect cooling medium is used as secondary air and/or fluidizing medium in the roaster.

8. The process according to claim 1, wherein small particles, which are concentrate particles with a diameter at least 50% smaller than the average diameter of the concentrate particles, and/or at least part of small calcine particles, which are particles from a gas-solid-fraction separated in at least one step, and/or at least part of the other particles and/or further particles are pelletized by mixing with a liquid binder comprising water or an aqueous solution containing sulfates, said further particles comprising calcine particles and/or sand and/or unseparated concentrate particles.

9. The process according to claim 1, wherein small particles, which are concentrate particles with a diameter at least 50% smaller than the average diameter of the concentrate particles, and/or at least part of small calcine particles, which are particles from a gas-solid-fraction separated in at least one step, and/or at least part of the other particles and/or further particles are pelletized by mixing with further particles, said further particles comprising calcine particles and/or sand and/or unseparated concentrate particles.

10. The process according to claim 1, wherein downstream of the roaster at least parts of the calcine are leached in leaching solution with an acid content leading to pH value of 2 or less and/or are leached in a cyanide solution or are smelted or introduced into an electric furnace.

11. The process according to claim 1, wherein not recirculated calcine particles are milled and/or grinded.

* * * * *